June 25, 1940.  W. L. FISCHER  2,205,401

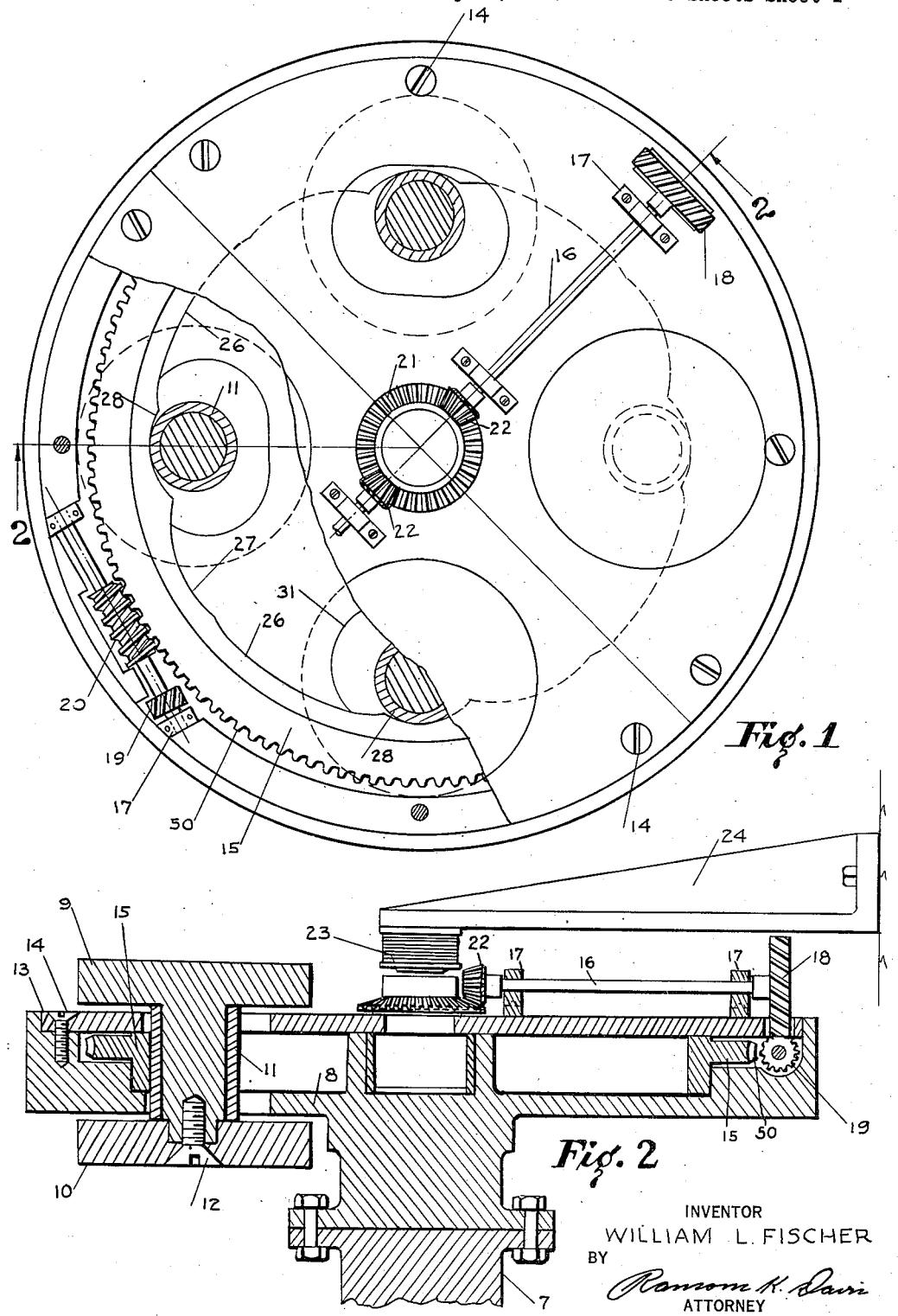

TORSIONAL VIBRATION DAMPER

Filed May 13, 1939  5 Sheets-Sheet 3

INVENTOR
*William L. Fischer*
BY
*Ransom K. Davis*
ATTORNEY

June 25, 1940.    W. L. FISCHER    2,205,401
TORSIONAL VIBRATION DAMPER
Filed May 13, 1939    5 Sheets-Sheet 4

INVENTOR
WILLIAM L. FISCHER
BY
Ransom K. Davis
ATTORNEY

INVENTOR
WILLIAM L. FISCHER
BY
ATTORNEY

Patented June 25, 1940

2,205,401

UNITED STATES PATENT OFFICE 2,205,401

TORSIONAL VIBRATION DAMPER

William L. Fischer, Philadelphia, Pa.

Application May 13, 1939, Serial No. 273,450

30 Claims. (Cl. 74—604)

(Granted under the act of March 3, 1883, as amended April 30, 1928; 370 O. G. 757)

This invention relates to a type of torsional vibration damper, which is known under the name of "dynamic damper" or "resonance pendulum damper" and which is in use to prevent the development of dangerous torsional vibrations in powershafts especially in the crankshafts of internal combustion engines. Various designs of such dampers have been described in Letters Patent, for example, in the U. S. Patents Nos. 2,029,796 or 2,079,226 or 2,098,571, etc. This invention, however, adds a new and useful feature to each one of these designs, a feature which can shortly be defined as: "variable tuning".

A resonance pendulum damper consists basically of a pendulum mass, linked to a rotating and torque-transmitting shaft and swinging relative to the shaft with such a frequency, that it comes in resonance with one particular harmonic disturbance, occurring in said shaft, for example, with the third order harmonic, which is defined by three torque peaks per crankshaft revolution. Present resonance pendula are all designed for a fixed pendulum length and consequently they have a fixed tuning and can combat one harmonic only, though they do so at any engine speed. However, for the practical purpose of preventing undue stresses in a crankshaft, the damping effect produced by these devices is not needed at any engine speed, but only at and near a socalled critical speed, where the twisting of the crankshaft becomes very severe.

On the other hand, most internal combustion engines have more than one critical speed. A twelve cylinder V-type engine, for example, may suffer from a 6th order harmonic, causing a critical speed at 500 revolutions per minute, also from a 3rd order at 1,000 R. P. M. and from a 1½ order at 2,000 R. P. M. In such a case and especially when the engine in question has to operate over a wide speed range, it is very desirable to be able to suppress the torsional vibrations caused by all these dangerous harmonics without going to the expense, weight and complication to use a special dynamic damper for each one of them. This can be accomplished with this invention, whose main idea is to vary the tuning of a resonance pendulum damper during operation of the engine.

With the foregoing and other objects in view, the invention consists in the construction, combination and arrangement of parts hereinafter described and illustrated in the drawings, in which:

Fig. 1 is an elevation view of one embodiment of this invention, partly broken away.

Fig. 2 is a sectional view on line 2—2 of Fig. 1.

Figure 5:
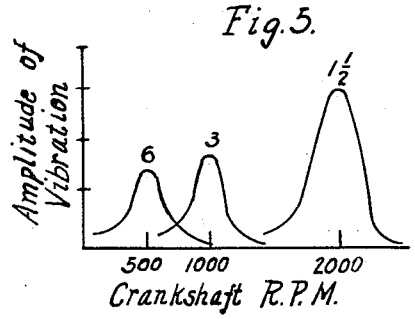
Fig. 5 is a graph of vibrations as they may occur in a 12 cylinder V-type engine.

There is shown in Fig. 5 how the amplitudes in a 12 cylinder V-type engine increase near the critical speeds.

Figure 6:
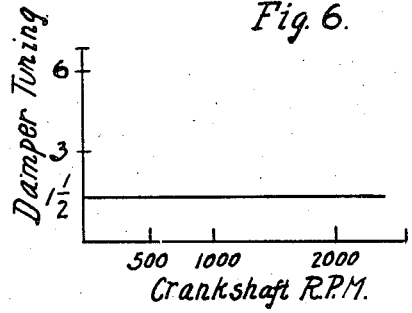
Fig. 6 is a graph showing how a present type pendulum damper is tuned to one particular harmonic only, the 1½ order in this example.

In Fig. 6 is shown a graph with a pendulum damper tuned to the harmonic of the 1½ order.

Figure 7:
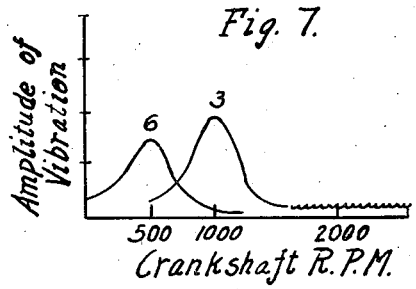
Fig. 7 is a graph showing the damping effect of a damper tuned as per Fig. 6.

Fig. 7 shows that a present type damper could take out only one disturbance (the 1½ order in this example) and that the other two dangerous harmonics would still act on the crankshaft and produce dangerous amplitudes (the 6th and 3rd order in this example).

Figure 8:
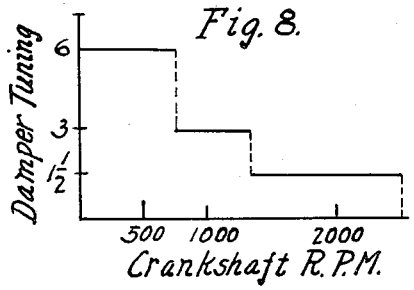
Fig. 8 is a graph showing the tuning of a variable tuning damper designed to meet the conditions of Fig. 5.

Fig. 8 shows that the damper of variable tuning, when used on an engine as in Fig. 6 would be tuned from 0 R. P. M. to about 750 R. P. M. to the 6-order . . . from 750 R. P. M. to about 1400 R. P. M. to the 3rd order . . . and from 1400 R. P. M. to the top speed to the 1½ order.

Figure 9:
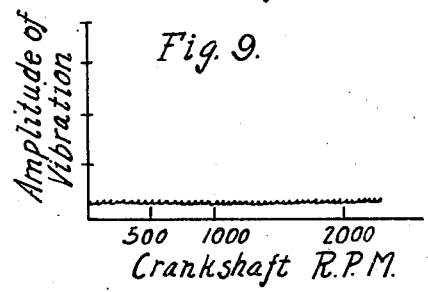
Fig. 9 is a graph showing the damping effect of a damper tuned as per Fig. 8.

Fig. 9 shows the effect of a damper tuned as per Fig. 8 with variable tuning: all three dangerous harmonics have been suppressed.

Figure 10:
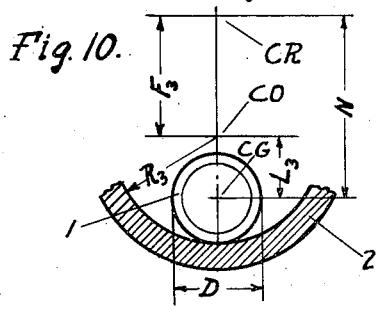
Fig. 10 shows the kinematic situation, when the fulcrum distance ($F_3$) is large and the pendulum length ($L_3$) is small.

On Fig. 10 the terms used in this specification are defined and illustrated:

CR is the center of rotation, that means: the intersection of the crankshaft main axis with the plane of the damper, in which the pendula oscillate.

CO is the center of oscillation, that means: the point, around which the bushing 1 moves during oscillation of the pendulum.

R3 is the radius for the raceway 2.

CG is the center of gravity of the pendulum bob.

F3 is the "fulcrum distance" meaning the distance of the center of oscillation from the center of rotation of the shaft.

L is the "pendulum length". It is the distance between fulcrum point (or center of oscillation) and the center of gravity of the pendulum bob.

D is the outside diameter of the bushing or antifriction bearing, which contacts the raceway 2 and supports the bob.

N is the distance between the center of rotation of the crankshaft main axis and the center of gravity of the pendulum bob.

The basic formula for proper dimensioning of the pendulum and its supports, etc., is:

$$\frac{F}{L} = H^2 + C$$

Where F and L are the distances, just defined, while H is the number of oscillations, to which the pendulum will tune—it is the harmonic order defined in "oscillations per one shaft revolution". From this equation, written in the form:

$$H = \sqrt{\frac{F}{L} - C}$$

in which C denotes an empirical correction factor, which depends on minor details of the particular design such as friction, type of pendulum used (simple or compound) radius of gyration of the pendulum bob, etc. It is evident, that the tuning of the damper can be varied by varying the ratio:

$$\frac{F}{L}$$

This in turn can be accomplished by either varying F alone, or varying L alone, or varying F and L simultaneously, but not by the same percentage. Which method of variation may be used in a practical case depends on design conditions. The essential point is, that the ratio $$\frac{F}{L}$$

must be varied, to produce a change in tuning of the damper.

Figure 11:
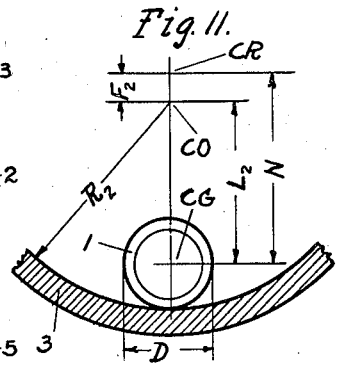
Fig. 11 shows the kinematic situation, when the fulcrum distance ($F_2$) is small and the pendulum length ($L_2$) is large.

Fig. 11 shows the situation if F is decreased and L increased to produce a ratio $$\frac{F_2}{L_2}$$

which is considerably different from the ratio $$\frac{F_3}{L_3}$$

as shown on Fig. 10. So without changing N or D but by merely changing the raceway radius R from R3 to R2 (which automatically affects of course the fulcrum distance F) the tuning of the damper can be changed considerably.

Figure 12:
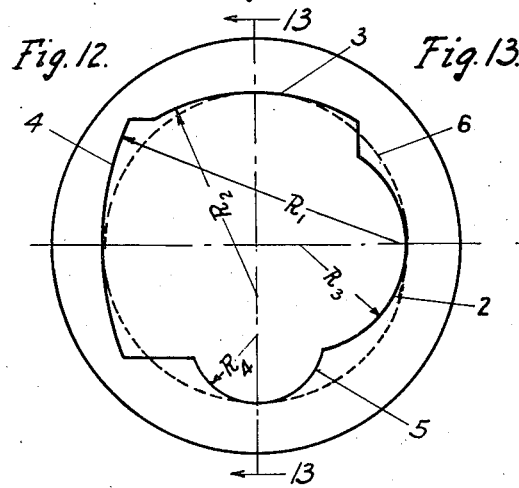
Fig. 12 shows a bushing containing four raceways of different radii.
Figure 13:
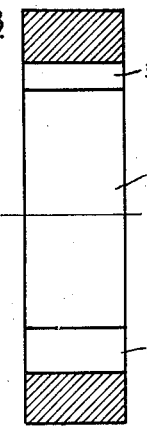
Fig. 13 is a sectional view on line 13—13 of Fig. 12.

Figs. 12 and 13 show a raceway bushing, in which the raceway radius varies from R1 down to R4 in steps. Bushings of such type are used in the design of Figs. 3 and 4.

Figs. 1 and 2 show one application of my invention. Item 7 is a shaft or crankshaft, to which the damper main body 8 is rigidly attached by flanges and bolts. The main body 8 houses a hardened steel bushing 15, the inside contour of which comprises four groups of raceways. Each group consists of one raceway having a small radius 28, one raceway having a medium radius 27 and one raceway with a large radius 26. Contacting the bushing 15 are four identical spool type pendulum masses. Each spool mass is composed of a flange 9 having a pin which carries the bushing or antifriction bearing 11 and another flange 10 which fastens to flange 9 by means of a screw 12. The raceway bushing 15 is held in the main body 8 by means of the cover plate 13, which is secured by a number of screws 14. The raceway bushing 15 can rotate inside of the damper main body 8. The means to rotate the raceway bushing 15 include a wormgear 50 cut into the rim of the raceway bushing 15, two self-locking worms 20, engaging said wormgear 50 and a gear train consisting of spiral gears 18 and 19, shaft 16 held in bearings 17, bevel gears 22 and finally the main bevel gear 21, which meshes with bevel gears 22. Due to the locking effect of the two worms 20, the raceway bushing 15 is normally held tight to the damper body 8, and revolves with the same, when the engine is running. Each pendulum bob is now in contact with the same type raceway 28, as shown in Fig. 2. When the pendulum begins to oscillate, the bushing 11 will roll along the raceway 28 over a certain angle (say 10 to 20 degrees) to either side from its neutral position. It will not hit the contour of the slots 31 which are cut into the damper body 8 and the coverplate 13. These slots merely serve to hold the spools in place during a changeover from one raceway to another one. This change-over is accomplished by momentarily stopping the main bevel 21 (when the engine is running) by some external means, such as an electromagnetic brake 23 supported from a floor-pedestal 24 as shown or by a friction brake or a similar conventional device including a quick acting switch if necessary. The stopping of bevel 21, when the shaft 7 is revolving, causes the small bevels 22 to revolve around the axis of shaft 16 and thus driving the spiral gears 18 and 19 they make the raceway bushing 15 creep in relation to the damper body 8 and its four pendula which are held inside the slots 31. The four spools are lifted over the humps and dropped onto the other raceways. In a practical application some conventional means, such as electrical position indicators, etc., will be used, to indicate the momentary position of raceway 15 in the damper body 8 and stop it at the desired location by releasing the electromagnetic brake 23. The shifting of the raceway bushing 15 relative to the damper body 8 can of course also be made automatically by having the electromagnetic brake 23 be actuated from a tachometric element in such a way that for a given speed range as has been explained before on Fig. 8 the proper raceway is put in service, that is, in contact with the spools.

Figure 3:
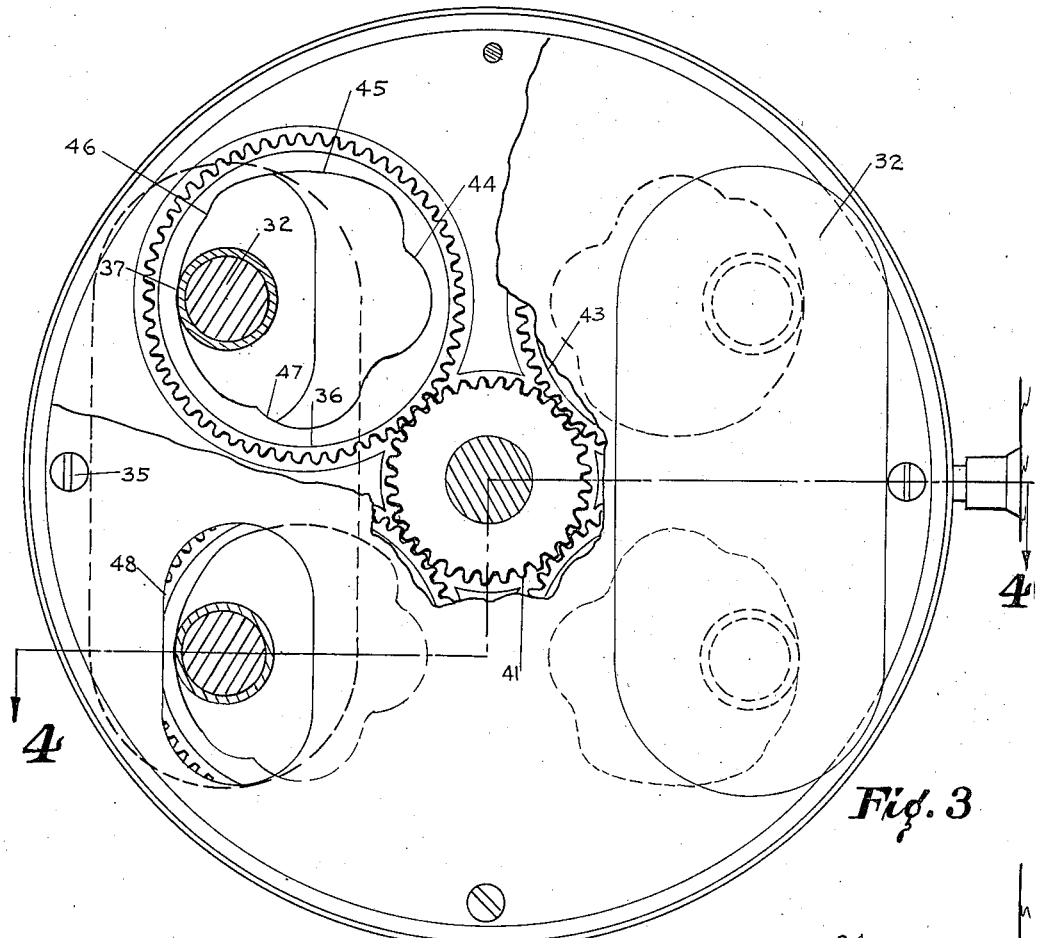
Fig. 3 is an elevational view of another embodiment of this invention, partly broken away.
Figure 4:
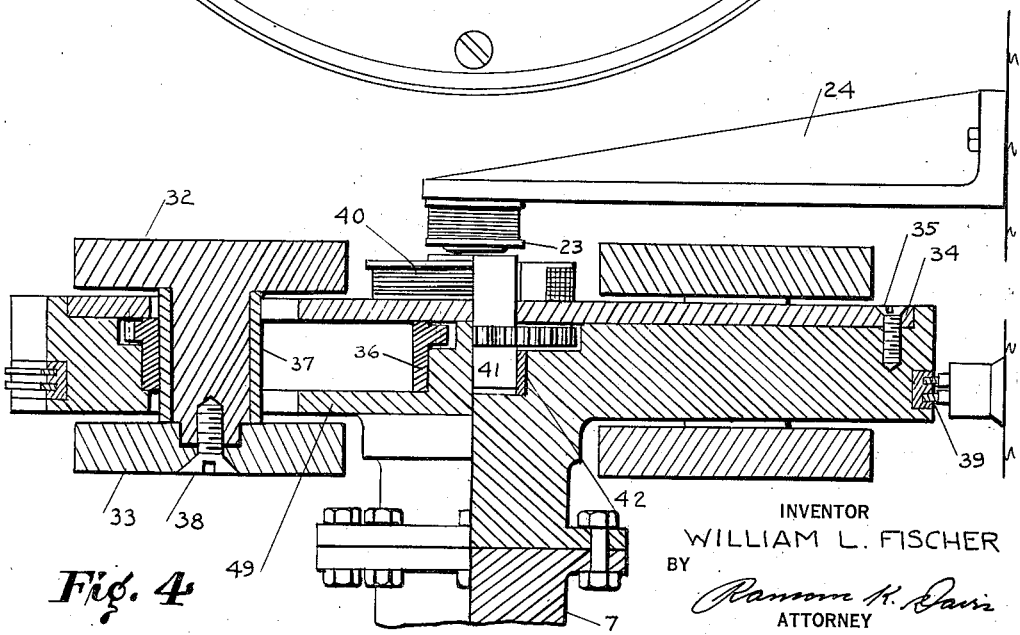
Fig. 4 is a sectional view on line 4—4 of Fig. 3.

Figs. 3 and 4 show another application of this invention, which differs only slightly from the one illustrated by Figs. 1 and 2. Instead of four "single support" bobs, two "twin support" pendula are now employed. Instead of one large raceway bushing 15 of Fig. 1, four raceway bushings 36 are used, which in case of a changeover are moved simultaneously by the common pinion 41. In order to lock this pinion 41 and through it the four raceway bushings 36 securely onto the damper main body 49 an electromagnetic clutch 40 is used. The change in tuning of this damper is then produced by momentarily disengaging the electromagnetic clutch 40 and applying the electromagnetic brake 23, while the shaft 7 is revolving utilizing a quick acting switch, if necessary. This action will stop the pinion 41 and thus revolve the four raceways around their own axes and bring another group of raceways in contact with the four bushings 37, which support the two pendulum bobs. At 39 is shown a conventional slip ring, which carries electric current to the electromagnetic clutch 40, which rotates with the damper body 49. At 42 is shown a bushing, in which the pinion 41 can rotate. It is obvious, that the damper must be designed so, that it is in perfect static and dynamic balance for any setting of the raceway bushing. The raceway bushing 15 of Figs. 1 and 2 is shown as having four groups of identical raceways. In more complicated engine installations, it may occur, that two different harmonics are active at the same engine speed. For example, the 12th order one-noded harmonic could be present at the same engine R. P. M. as the 3rd order one-noded. In such a case the design of Figs. 1 and 2 could be modified in such a way that two spools (opposite to each other) would be tuned to one type harmonic, say the 3rd order, while simultaneously the other two spools would react to another harmonic, say the 12th order by making raceways of one pair different from that of the other pair. This point is mentioned to show that a tunable damper can, if properly designed to meet the special requirements of an engine, suppress all dangerous harmonics and make the whole operating range free from excessive vibrations. The basic idea of this invention is also applicable to a damper, having one pendulum only as used in present radial aircraft engines. By proper design of the raceway bushing the static and dynamic balance of the crankshaft could be maintained for any position of the raceway bushing relative to the crankshaft.

Figure 14:
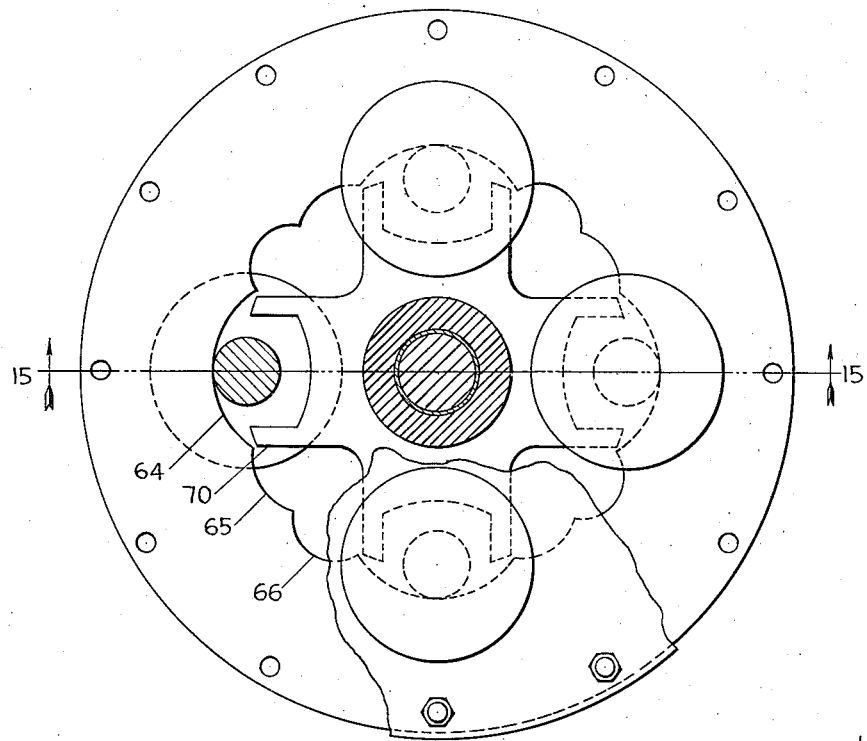
Fig. 14 is an elevational view of still another embodiment of this invention, partly broken away.
Figure 15:
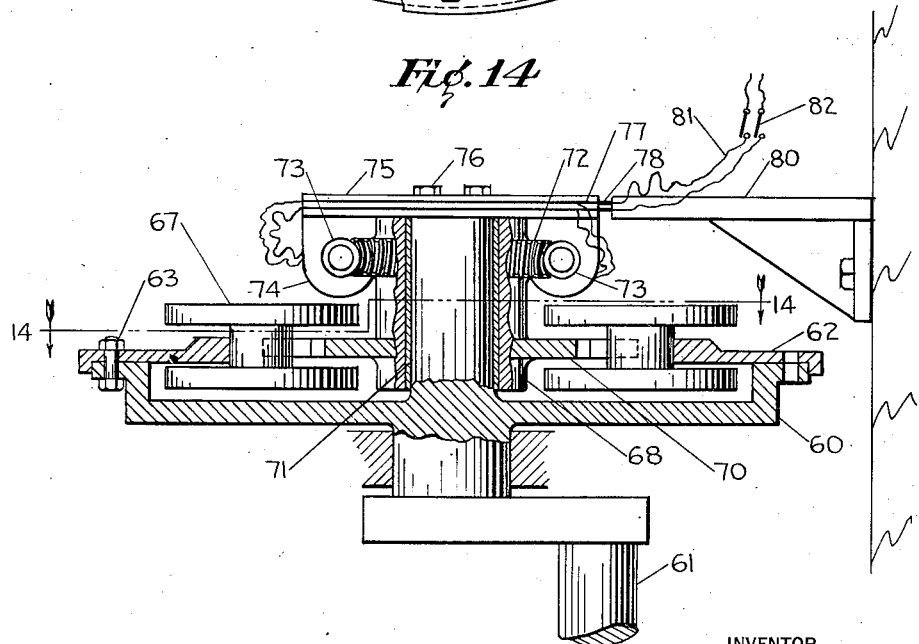
Fig. 15 is a partly sectional view on line 15—15 of Fig. 14.

In the form of the invention shown in Figs. 14 and 15 the main damper body or flywheel 60 is formed as an integral part of the tail end of the crankshaft 61. A ring 62 having four groups of raceways is secured to the damper body or flywheel 60 by means of bolts 63. Each group of raceways covers an arc of 90 degrees and comprises one annular raceway 64 with a large radius of curvature, one annular raceway 65 with medium curvature, and one annular raceway 66 with a small curvature.

As already set forth in connection with Figs. 5 to 13 inclusive, above, three different tunings for the damper may thus be produced by merely shifting the four spools 67 angularly to the desired raceways. This shifting is done by moving the hub member 68, from which extends four forks 70, over a small angle until the four spools 67 each center into the selected raceway of the desired curvature, it being obvious that with the raceways being similarly grouped in each quadrant the four spools will each be in a raceway of identical curvature at the same time. The hub 68 is journalled on the crankshaft extension 71 and is thus concentric with the center of rotation of the crankshaft 61. In order to thus shift the spools angularly from the raceways of one curvature to the raceways of another curvature there is provided a double wormgear drive consisting of a wormwheel 72 on the hub 68 and a pair of worms 73, each worm 73 being operated by an electric motor 74 mounted on a disc 75, which disc is secured by bolts 76 to the shaft extension 71. The operation of the electric motors 74 is controlled by a brush ring 77 carried on the periphery of the disc 75 and brushes 78 mounted on a floor stand 80 and provided with leads 81 connected to a suitable switch 82 for momentarily causing the electric circuit to operate the motors and thus cause rotation of the worm and of the forks to place the spools in the desired raceways.

The wormgears are self-locking, whereby when the switch 82 is operated, disconnecting the circuit, the forks 70 are locked in position relative to the crankshaft. Two motors are provided rather than one, so that the weight of the one will balance the weight of the other. The raceways and pins of the spools in this form, as well as in the other forms, must be hardened and ground to reduce friction to the minimum.

Figure 16:
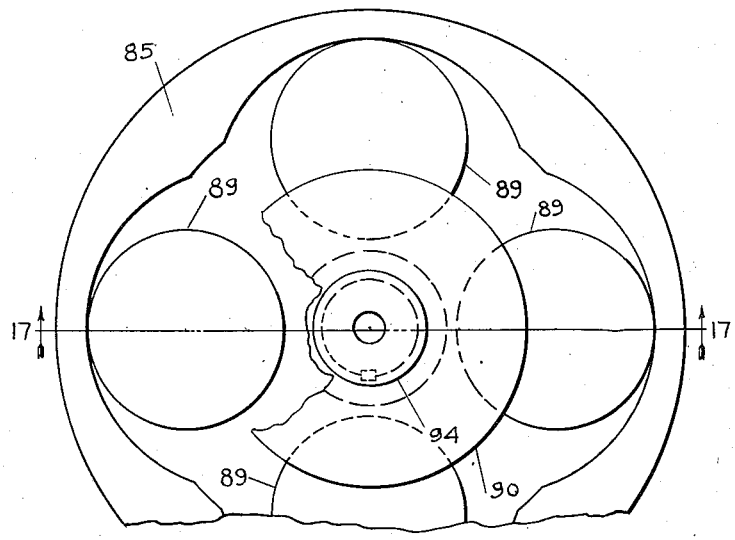
Fig. 16 is a fragmentary elevational view of yet another embodiment of this invention.
Figure 17:
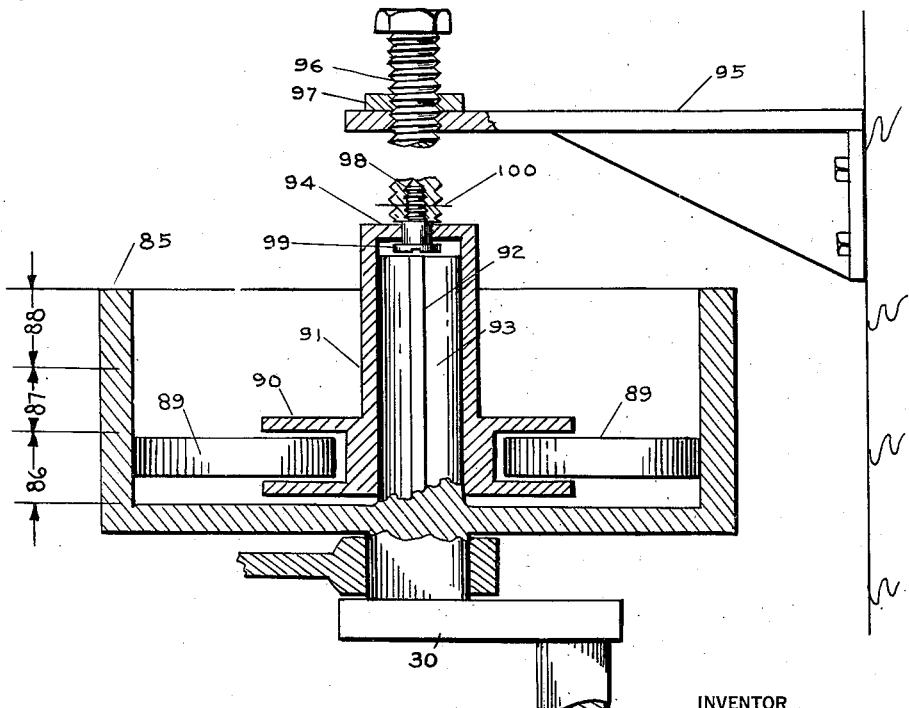
Fig. 17 is a partly sectional side view on line 17—17 of Fig. 16.

In the embodiment of the invention shown in Figs. 16 and 17, the damper body or flywheel is provided with raceways 86, 87, and 88, arranged in groups axially. To change the tuning of the damper, the four rollers 89 are simply moved axially from one group of raceways to another group of raceways. This is done by means of the grooved ring 90 which extends from a sleeve 91 keyed as at 92 to the crankshaft extension 93. The sleeve 91 may be moved longitudinally along the axis of shaft extension 93, but rotates as a unit relative thereto. In order to move the sleeve 91 axially, its capped end 94 is spaced from the end of shaft extension 93. A floor stand 95 is provided with a bolt 96 having its longitudinal axis coincident with the longitudinal axis of the crankshaft and crankshaft extension, a lock nut 97 being provided for holding the bolt 96 against undesired rotation. A stud screw 98 extends through the apertured capped end 94 of sleeve 91 and has its head 99 within the capped end between such end and the end of the crankshaft extension 93, a lock pin 100 being inserted through aligned apertures in the bolt 96 and stud screw 98 to prevent undesired relative rotation therebetween.

In the operation of this form of the invention the raceways 86 would be of large radii good for the 1½ order. The portion designated 87 would have radii for the 3rd order, and the portion 88 would be for the 6th order of tuning. To shift from one tuning to another, the lock nut 97 is loosened and the bolt 96 turned one way or the other so as to draw or push sleeve 91 along the crankshaft extension 93 and by means of grooved ring 90, push the rollers 89 from one group of raceways axially to the desired group of raceways. Obviously, this must be done slowly so that the rollers 89 will travel axially from one group of raceways to the next at the points where their radii will coincide.

Other modifications and changes in the proportions and arrangements of the parts may be made by those skilled in the art without departing from the nature and scope of the invention, as defined in the appended claims.

The invention described herein may be manufactured and/or used by or for the Government of the United States of America for governmental purposes without the payment of any royalties thereon or therefor.

Having thus set forth and disclosed the nature of this invention, what is claimed is:

1. A torsional vibration damper comprising a shaft, a rigid mass linked to the shaft, said mass being free to swing like a pendulum and means to vary the ratio of fulcrum distance to pendulum length during rotation of said shaft to a selected ratio, said means including means for maintaining the selected ratio as desired.

2. A torsional vibration damper, comprising a shaft, a multiplicity of rigid masses linked to the shaft, these masses being free to swing like pendula and means to vary the ratio of fulcrum distance to pendulum length for all these pendula during the rotation of said shaft to a selected ratio, said means including means for maintaining the selected ratio as desired.

3. A torsional vibration damper, comprising a shaft, a multiplicity of rigid masses linked to the shaft, these masses being free to swing like pendula and means, to vary the ratio of fulcrum distance to pendulum length for all these pendula simultaneously and in the same proportion during the rotation of said shaft to a selected ratio, said means including means for maintaining the selected ratio as desired.

4. A torsional vibration damper, comprising a shaft, a multiplicity of rigid masses linked to the shaft, these masses being free to swing like pendula and means to vary the ratio of fulcrum distance to pendulum length for all these pendula simultaneously but in different proportion during the rotation of said shaft to a selected ratio, said means including means for maintaining the selected ratio as desired.

5. A torsional vibration damper, comprising a shaft, a multiplicity of rigid masses linked to the shaft, these masses being free to swing like pendula and means to vary the ratio of fulcrum distance to pendulum length for all these pendula simultaneously and automatically according to predetermined empirical rules during the rotation of said shaft to a selected ratio, said means including means for maintaining the selected ratio as desired.

6. A torsional vibration damper of the resonance pendulum type employing rigid masses linked to a shaft and free to swing relative to said shaft, said damper providing means to tune said shaft at will to any desired harmonic during operation of the engine carrying said damper and means for maintaining the tuning at the selected harmonic as desired.

7. An arrangement for protecting rotary shafts against speed oscillations, vibrations and jerks due to disturbing forces comprising a fly wheel, means for securing said fly wheel to said shaft, a rigid part rigidly yet movably carried by the fly wheel and provided with a plurality of groups of convex guiding surfaces, the guiding surfaces in each group being identical but different from the guiding surfaces of the other groups, a plurality of rigid masses independent from one another and from the shaft and provided with a contact surface adapted to bear against a selected one of the guiding surfaces of said rigid part, said masses being adapted to rock with very slight friction over the guiding surface of the rigid part under the opposite action of the disturbing forces and of the centrifugal forces applying the contact surfaces of the masses against the guiding surfaces of the rigid part.

8. An arrangement for protecting rotary shafts against speed oscillations, vibrations and jerks due to disturbing forces comprising a fly wheel, means for securing said fly wheel to said shaft, a rigid part rigidly yet movably carried by the fly wheel and provided with a plurality of groups of convex guiding surfaces, the guiding surfaces in each group being identical but different from the guiding surfaces of the other groups, a plurality of rigid masses independent from one another and from the shaft and provided with a contact surface adapted to bear against a selected one of the guiding surfaces of said rigid part, said masses being adapted to rock with a rolling motion and very slight friction over the guiding surface of the rigid part under the opposite action of the disturbing forces and of the centrifugal forces applying the contact surfaces of the masses against the guiding surfaces of the rigid part.

9. An arrangement for protecting rotary shafts against speed oscillations, vibrations and jerks due to disturbing forces comprising a fly wheel, means for securing said fly wheel to said shaft, a rigid part rigidly yet movably carried by the fly wheel and provided with a plurality of groups of cylindrical convex guiding surfaces, the guiding surfaces in each group being identical but different from the guiding surfaces of the other groups, a plurality of rigid masses independent from one another and from the shaft and provided with a contact surface adapted to bear against a selected one of the guiding surfaces of said rigid part, said masses being adapted to rock with very slight friction over the cylindrical guiding surface of the rigid part under the opposite action of the disturbing forces and of the centrifugal forces applying the contact surfaces of the masses against the guiding surfaces of the rigid part.

10. An arrangement for protecting rotary shafts against speed oscillations, vibrations and jerks due to disturbing forces comprising a fly wheel, means for securing said fly wheel to said shaft, a rigid part rigidly yet movably carried by the fly wheel and provided with a plurality of groups of cylindrical convex guiding surfaces, the guiding surfaces in each group being identical but different from the guiding surfaces of the other groups, a plurality of rigid masses of revolution independent from one another and from the shaft and provided with a contact surface integral therewith and adapted to bear against a selected one of the guiding surfaces of said rigid part, said masses being adapted to rock with very slight friction over the cylindrical guiding surface of the rigid part under the opposite action of the disturbing forces and of the centrifugal forces applying the contact surfaces of the masses against the guiding surfaces of the rigid part.

11. An arrangement for protecting rotary shafts against speed oscillations, vibrations and jerks due to disturbing forces acting $n_1$ times per revolution of the shaft at one range of rates of revolution of the shaft, $n_2$ times at another range, and $n_x$ times at yet another range, comprising a fly wheel, means for securing said fly wheel to said shaft, a rigid part rigidly yet movably carried by the fly wheel and provided with a plurality of groups of cylindrical convex guiding surfaces, the guiding surfaces in each group being identical but different from the guiding surfaces of the other groups, a plurality of rigid masses of revolution independent from one another and from the shaft and provided with a contact surface integral therewith and adapted to bear against a selected one of the guiding surfaces of said rigid part, said masses being adapted to rock in a plane perpendicular to the axis of the shaft with very slight friction over the cylindrical guiding surface of the rigid part under the opposite action of the disturbing forces and of the centrifugal forces applying the contact surfaces of the masses against the guiding surfaces of the rigid part at a frequency substantially equal to $n$ of the selected range.

12. An arrangement for protecting rotary shafts against speed oscillations, vibrations and jerks due to disturbing forces comprising a fly wheel, means for securing said fly wheel to said shaft, a plurality of rigid parts rigidly yet movably carried by the fly wheel and provided with a plurality of groups of convex guiding surfaces, the guiding surfaces in each group being identical but different from the guiding surfaces of the other groups, a plurality of rigid masses independent from one another and from the shaft and provided with contact surfaces adapted to bear against selected ones of the guiding surfaces of a corresponding rigid part, said masses being adapted to rock with very slight friction over the guiding surfaces of the corresponding rigid part under the opposite action of the disturbing forces and of the centrifugal forces applying the contact surfaces of the masses against the guiding surfaces of the rigid parts.

13. An arrangement for protecting rotary shafts against speed oscillations, vibrations and jerks due to disturbing forces comprising a fly wheel, means for securing said fly wheel to said shaft, a plurality of rigid parts rigidly yet movably carried by the fly wheel and provided with a plurality of groups of convex guiding surfaces, the guiding surfaces in each group being identical but different from the guiding surfaces of the other groups, a plurality of rigid masses independent from one another and from the shaft and provided with contact surfaces adapted to bear against selected ones of the guiding surfaces of a corresponding rigid part, said masses being adapted to rock with a rolling motion and very slight friction over the guiding surfaces of the corresponding rigid part under the opposite action of the disturbing forces and of the centrifugal forces applying the contact surfaces of the masses against the guiding surfaces of the rigid parts.

14. An arrangement for protecting rotary shafts against speed oscillations, vibrations and jerks due to disturbing forces comprising a fly wheel, means for securing said fly wheel to said shaft, a plurality of rigid parts rigidly yet movably carried by the fly wheel and provided with a plurality of groups of cylindrical convex guiding surfaces, a plurality of rigid masses independent from one another and from the shaft and provided with contact surfaces adapted to bear against selected ones of the guiding surfaces of a corresponding rigid part, said masses being adapted to rock with very slight friction over the cylindrical guiding surfaces of the corresponding rigid part under the opposite action of the disturbing forces and of the centrifugal forces applying the contact surfaces of the masses against the guiding surfaces of the rigid parts.

15. An arrangement for protecting rotary shafts against speed oscillations, vibrations and jerks due to disturbing forces comprising a fly wheel, means for securing said fly wheel to said shaft, a plurality of rigid parts rigidly yet movably carried by the fly wheel and provided with a plurality of groups of cylindrical convex guiding surfaces, the guiding surfaces in each group being identical but different from the guiding surfaces of the other groups, a plurality of rigid masses of revolution independent from one another and from the shaft and provided with contact surfaces integral therewith and adapted to bear against selected ones of the guiding surfaces of a corresponding rigid part, said masses being adapted to rock with very slight friction over the cylindrical guiding surfaces of the corresponding rigid part under the opposite action of the disturbing forces and of the centrifugal forces applying the contact surfaces of the masses against the guiding surfaces of the rigid parts.

16. An arrangement for protecting rotary shafts against speed oscillations, vibrations and jerks due to disturbing forces acting $n_1$ times per revolution of the shaft at one range of rates of revolution of the shaft, $n_2$ times at another range, and $n_x$ times at yet another range, comprising a fly wheel, means for securing said fly wheel to said shaft, a plurality of rigid parts rigidly yet movably carried by the fly wheel and provided with a plurality of groups of cylindrical convex guiding surfaces, a plurality of rigid masses of revolution independent from one another and from the shaft and provided with contact surfaces integral therewith and adapted to bear against selected ones of the guiding surfaces of a corresponding rigid part, said masses being adapted to rock in a plane perpendicular to the axis of the shaft with very slight friction over the cylindrical guiding surfaces of the corresponding rigid part under the opposite action of the disturbing forces and of the centrifugal forces applying the contact surfaces of the masses against the guiding surfaces of the rigid parts at a frequency substantially equal to $n$ of the selected range.

17. An arrangement for protecting rotary shafts against speed oscillations, vibrations and jerks due to disturbing forces comprising a fly wheel, means for securing said fly wheel to said shaft, a rigid part rigidly yet movably carried by the fly wheel and provided with a plurality of groups of convex guiding surfaces, the guiding surfaces in each group being identical but different from the guiding surfaces of the other groups, a plurality of rigid masses independent from one another and from the shaft and provided with a contact surface adapted to bear against a selected one of the guiding surfaces of said rigid part, said masses being adapted to rock with very slight friction over the guiding surface of the rigid part under the opposite action of the disturbing forces and of the centrifugal forces applying the contact surfaces of the masses against the guiding surfaces of the rigid part, and means for moving said rigid part relative to said fly wheel while said fly wheel is rotating to substitute another selected group of guiding surfaces for the group of surfaces already in contact with the contact surfaces of said rigid masses.

18. An arrangement for protecting rotary shafts against speed oscillations, vibrations and jerks due to disturbing forces comprising a fly wheel, means for securing said fly wheel to said shaft, a plurality of rigid parts rigidly yet movably carried by the fly wheel and provided with a plurality of groups of convex guiding surfaces, the guiding surfaces in each group being identical but different from the guiding surfaces of the other groups, a plurality of rigid masses independent from one another and from the shaft and provided with contact surfaces adapted to bear against selected ones of the guiding surfaces of a corresponding rigid part, said masses being adapted to rock with very slight friction over the guiding surfaces of the corresponding rigid part under the opposite action of the disturbing forces and of the centrifugal forces applying the contact surfaces of the masses against the guiding surfaces of the rigid parts, and means for moving said rigid parts simultaneously relative to said fly wheel while said fly wheel is rotating to substitute another selected group of guiding surfaces for the group of surfaces already in contact with the contact surfaces of said rigid masses.

19. An arrangement for protecting rotary shafts against speed oscillations, vibrations and jerks due to disturbing forces comprising a fly wheel, means for securing said fly wheel to said shaft, a rigid part rigidly yet movably carried by the fly wheel and provided with a plurality of groups of convex guiding surfaces, the guiding surfaces in each group being identical but different from the guiding surfaces of the other groups, a plurality of rigid masses independent from one another and from the shaft and provided with a contact surface adapted to bear against a selected one of the guiding surfaces of said rigid part, said masses being adapted to rock with very slight friction over the guiding surface of the rigid part under the opposite action of the disturbing forces and of the centrifugal forces applying the contact surfaces of the masses against the guiding surfaces of the rigid part, and means for moving said rigid part relative to said fly wheel while said fly wheel is rotating to substitute another selected group of guiding surfaces for the group of surfaces already in contact with the contact surfaces of said rigid masses, said means including a worm gear on said rigid part, worm means in mesh with said worm gear, spiral gear means in mesh with said worm means, shaft means on one end of which is mounted said spiral gear means, bevel means on the other end of said shaft means, a bevel gear in mesh with said bevel means said bevel gear being mounted concentric with said fly wheel and normally stationary relative to said fly wheel, and means for causing relative motion between said bevel gear and said fly wheel while said fly wheel is in motion to thereby move said rigid part relative to said fly wheel.

20. An arrangement for protecting rotary shafts against speed oscillations, vibrations and jerks due to disturbing forces comprising a fly wheel, means for securing said fly wheel to said shaft, a rigid part rigidly yet movably carried by the fly wheel and provided with a plurality of groups of convex guiding surfaces, the guiding surfaces in each group being identical but different from the guiding surfaces of the other groups, a plurality of rigid masses independent from one another and from the shaft and provided with a contact surface adapted to bear against a selected one of the guiding surfaces of said rigid part, said masses being adapted to rock with very slight friction over the guiding surface of the rigid part under the opposite action of the disturbing forces and of the centrifugal forces applying the contact surfaces of the masses against the guiding surfaces of the rigid part, and means for moving said rigid part relative to said fly wheel while said fly wheel is rotating to substitute another selected group of guiding surfaces for the group of surfaces already in contact with the contact surfaces of said rigid masses, said means including a worm gear on said rigid part, worm means in mesh with said worm gear, spiral gear means in mesh with said worm means, shaft means on one end of which is mounted said spiral gear means, bevel means on the other end of said shaft means, a bevel gear in mesh with said bevel means said bevel gear being mounted concentric with said fly wheel and normally stationary relative to said fly wheel, and means for causing relative motion between said bevel gear and said fly wheel while said fly wheel is in motion to thereby move said rigid part relative to said fly wheel, said rigid masses extending through said fly wheel and said rigid part, and means on said fly wheel limiting the movement of said rigid masses relative to said fly wheel.

21. An arrangement for protecting rotary shafts against speed oscillations, vibrations and jerks due to disturbing forces comprising a fly wheel, means for securing said fly wheel to said shaft, a plurality of rigid parts rigidly yet movably carried by the fly wheel and provided with a plurality of groups of convex guiding surfaces, the guiding surfaces in each group being identical but different from the guiding surfaces of the other groups, a plurality of rigid masses independent from one another and from the shaft and provided with contact surfaces adapted to bear against selected ones of the guiding surfaces of a corresponding rigid part, said masses being adapted to rock with very slight friction over the guiding surfaces of the corresponding rigid part under the opposite action of the disturbing forces and of the centrifugal forces applying the contact surfaces of the masses against the guiding surfaces of the rigid parts, and means for moving said rigid parts simultaneously relative to said fly wheel while said fly wheel is rotating to substitute another selected group of guiding surfaces for the group of surfaces now in contact with the contact surfaces of said rigid masses, said means including gear teeth on said rigid parts, a gear concentric with and normally stationary relative to said fly wheel and in mesh said gear teeth on said rigid parts, and means for causing relative motion between said concentric gear and said fly wheel while said fly wheel is in motion to thereby move said rigid parts relative to said fly wheel.

22. An arrangement for protecting rotary shafts against speed oscillations, vibrations and jerks due to disturbing forces comprising a fly wheel, means for securing said fly wheel to said shaft, a plurality of rigid parts rigidly yet movably carried by the fly wheel and provided with a plurality of groups of convex guiding surfaces, the guiding surfaces in each group being identical but different from the guiding surfaces of the other groups, a plurality of rigid masses independent from one another and from the shaft and provided with contact surfaces adapted to bear against selected ones of the guiding surfaces of a corresponding rigid part, said masses being adapted to rock with very slight friction over the guiding surfaces of the corresponding rigid part under the opposite action of the disturbing forces and of the centrifugal forces applying the contact surfaces of the masses against the guiding surfaces of the rigid parts, and means for moving said rigid parts simultaneously relative to said fly wheel while said fly wheel is rotating to substitute another selected group of guiding surfaces for the group of surfaces already in contact with the contact surfaces of said rigid masses, said means including gear teeth on said rigid parts, a gear concentric with and normally stationary relative to said fly wheel and in mesh said gear teeth on said rigid parts, and means for causing relative motion between said concentric gear and said fly wheel while said fly wheel is in motion to thereby move said rigid parts relative to said fly wheel, said rigid masses extending through said fly wheel and said rigid parts, and means on said fly wheel limiting the movement of said rigid masses relative to said fly wheel.

23. An arrangement for protecting rotary shafts against speed oscillations, vibrations and jerks due to disturbing forces comprising a flywheel, means for securing said flywheel to said shaft, a rigid part carried by the flywheel and provided with a plurality of groups of convex guiding surfaces, the guiding surfaces in each group being identical but different from the guiding surfaces of the other groups, a plurality of rigid masses independent from one another and from the shaft and provided with a contact surface adapted to bear against a selected one of the guiding surfaces of said rigid part, said masses being adapted to rock with very slight friction over the guiding surface of the rigid part under the opposite action of the disturbing forces and of the centrifugal forces applying the contact surfaces of the masses against the guiding surfaces of the rigid part.

24. An arrangement for protecting rotary shafts against speed oscillations, vibrations and jerks due to disturbing forces comprising a flywheel, means for securing said flywheel to said shaft, a rigid part carried by the flywheel and provided with a plurality of groups of convex guiding surfaces, the guiding surfaces in each group being identical but different from the guiding surfaces of the other groups, a plurality of rigid masses independent from one another and from the shaft and provided with a contact surface adapted to bear against a selected one of the guiding surfaces of said rigid part, said masses being adapted to rock with a rolling motion and very slight friction over the guiding surface of the rigid part under the opposite action of the disturbing forces and of the centrifugal forces applying the contact surfaces of the masses against the guiding surfaces of the rigid part.

25. An arrangement for protecting rotary shafts against speed osscillations, vibrations and jerks due to disturbing forces comprising a flywheel, means for securing said flywheel to said shaft, a rigid part carried by the flywheel and provided with a plurality of groups of cylindrical convex guiding surfaces, the guiding surfaces in each group being identical but different from the guiding surfaces of the other groups, a plurality of rigid masses independent from one another and from the shaft and provided with a contact surface adapted to bear against a selected one of the guiding surfaces of said rigid part, said masses being adapted to rock with very slight friction over the cylindrical guiding surface of the rigid part under the opposite action of the disturbing forces and of the centrifugal forces applying the contact surfaces of the masses against the guiding surfaces of the rigid part.

26. An arrangement for protecting rotary shafts against speed oscillations, vibrations and jerks due to disturbing forces comprising a flywheel, means for securing said flywheel to said shaft, a rigid part carried by the flywheel and provided with a plurality of groups of cylindrical convex guiding surfaces, the guiding surfaces in each group being identical but different from the guiding surfaces of the other groups, a plurality of rigid masses of revolution independent from ane another and from the shaft and provided with a contact surface integral therewith and adapted to bear against a selected one of the guiding surfaces of said rigid part, said masses being adapted to rock with very light friction over the cylindrical guiding surface of the rigid part under the opposite action of the disturbing forces and of the centrifugal forces applying the contact surfaces of the masses against the guiding surfaces of the rigid part.

27. An arrangement for protecting rotary shafts against speed oscillations, vibrations and jerks due to disturbing forces acting $n_1$ times per revolution of the shaft at one range of rates of revolution of the shaft, $n_2$ times at another range, and $n_x$ times at yet another range, comprising a flywheel, means for securing said flywheel to said shaft, a rigid part carried by the flywheel and provided with a plurality of groups of cylindrical convex guiding surfaces, the guiding surfaces in each group being identical but different from the guiding surfaces of the other groups, a plurality of rigid masses of revolution independent from one another and from the shaft and provided with a contact surface integral therewith and adapted to bear against a selected one of the guiding surfaces of said rigid part, said masses being adapted to rock in a plane perpendicular to the axis of the shaft with very slight friction over the cylindrical guiding surface of the rigid part under the opposite action of the disturbing forces and of the centrifugal forces applying the contact surfaces of the masses against the guiding surfaces of the rigid part at a frequency substantially equal to $n$ of the selected range.

28. An arrangement for protecting rotary shafts against speed oscillations, vibrations and jerks due to disturbing forces comprising a flywheel, means for securing said flywheel to said shaft, a rigid part carried by the flywheel and provided with a plurality of groups of convex guiding surfaces, the guiding surfaces in each group being identical but different from the guiding surfaces of the other groups, a plurality of rigid masses independent from one another and from the shaft and provided with a contact surface adapted to bear against a selected one of the guiding surfaces of said rigid part, said masses being adapted to rock with very slight friction over the guiding surface of the rigid part under the opposite action of the disturbing forces and of the centrifugal forces applying the contact surfaces of the masses against the guiding surfaces of the rigid part, and means for shifting each of said plurality of rigid masses from a selected one of the guiding surfaces to another selected one of the guiding surfaces of said rigid part.

29. An arrangement for protecting rotary shafts against speed oscillations, vibrations and jerks due to disturbing forces comprising a flywheel, means for securing said flywheel to said shaft, a rigid part carried by the flywheel and provided with a plurality of groups of convex guiding surfaces, said convex guiding surfaces being arcuate paths, said paths being angularly spaced about said rigid part, the guiding surfaces in each group being identical but different from the guiding surfaces of the other groups, a plurality of rigid masses independent from one another and from the shaft and provided with a contact surface adapted to bear against a selected one of the guiding surfaces of said rigid part, said masses being adapted to rock with very slight friction over the guiding surface of the rigid part under the opposite action of the disturbing forces and of the centrifugal forces applying the contact surfaces of the masses against the guiding surfaces of the rigid part, and means for angularly moving said rigid masses from one selected group of paths to an angularly adjacent group of paths while the shaft is rotating.

30. An arrangement for protecting rotary shafts against speed oscillations, vibrations and jerks due to disturbing forces comprising a flywheel, means for securing said flywheel to said shaft, a rigid part carried by the flywheel and provided with a plurality of groups of convex guiding surfaces, said convex guiding surfaces being arcuate paths, said paths being axially spaced on said flywheel, the guiding surfaces in each group being identical but different from the guiding surfaces of the other groups, a plurality of rigid masses independent from one another and from the shaft and provided with a contact surface adapted to bear against a selected one of the guiding surfaces of said rigid part, said masses being adapted to rock with very slight friction over the guiding surface of the rigid part under the opposite action of the disturbing forces and of the centrifugal forces applying the contact surfaces of the masses against the guiding surfaces of the rigid part, and means for axially moving said rigid masses from one selected group of paths to an adjoining selected group of paths while the shaft is rotating.

WILLIAM L. FISCHER.